(12) United States Patent
Tatsuta et al.

(10) Patent No.: US 11,124,946 B2
(45) Date of Patent: Sep. 21, 2021

(54) CAB OF WORK VEHICLE, WORK VEHICLE, AND WHEEL LOADER

(71) Applicant: KOMATSU LTD., Tokyo (JP)

(72) Inventors: Hidenori Tatsuta, Tokyo (JP); Masato Kitashou, Tokyo (JP); Shohei Ikejiri, Tokyo (JP); Masahiko Hamaguchi, Tokyo (JP); Hirofumi Wada, Tokyo (JP)

(73) Assignee: KOMATSU LTD., Tokyo (JP)

( * ) Notice: Subject to any disclaimer, the term of this patent is extended or adjusted under 35 U.S.C. 154(b) by 30 days.

(21) Appl. No.: 16/474,157

(22) PCT Filed: Aug. 2, 2018

(86) PCT No.: PCT/JP2018/029021
§ 371 (c)(1),
(2) Date: Jun. 27, 2019

(87) PCT Pub. No.: WO2019/077847
PCT Pub. Date: Apr. 25, 2019

(65) Prior Publication Data
US 2019/0345689 A1 Nov. 14, 2019

(30) Foreign Application Priority Data
Oct. 20, 2017 (JP) .............................. JP2017-203425

(51) Int. Cl.
*E02F 9/16* (2006.01)
*B62D 33/06* (2006.01)
(Continued)

(52) U.S. Cl.
CPC ........... *E02F 9/16* (2013.01); *B60H 1/00285* (2013.01); *B62D 33/0617* (2013.01); *E02F 3/34* (2013.01)

(58) Field of Classification Search
CPC ... B62D 33/0617; B60R 21/11; B60R 21/131; E02F 9/16; E02F 9/163
See application file for complete search history.

(56) References Cited

U.S. PATENT DOCUMENTS 3,397,008 A * 8/1968 Timmerman ............ B60N 2/38
296/190.11
4,721,031 A * 1/1988 Nakata ............... B62D 33/0617
296/190.09
(Continued)

FOREIGN PATENT DOCUMENTS

EP     2 664 716 A1    11/2013
JP     S52-55001 U    4/1977
(Continued)

OTHER PUBLICATIONS

Written Opinion dated Oct. 16, 2018 for PCT/JP2018/029021.

*Primary Examiner* — Gregory A Blankenship
(74) *Attorney, Agent, or Firm* — Faegre Drinker Biddle & Reath LLP

(57) ABSTRACT

Each of a pair of rear side face windows of a cab extends rearward from each of a pair of rearmost pillars. A rear face window is connected to each of the pair of rear side face windows and located in the rear of the rearmost pillars. The rear face window is inclined such that an upper portion thereof is located more rearward than a lower portion thereof, and it is entirely made of glass from a first rear side face window representing one of the pair of rear side face windows to a second rear side face window representing the other of the pair of rear side face windows.

14 Claims, 4 Drawing Sheets

(51) Int. Cl.
*B60H 1/00* (2006.01)
*E02F 3/34* (2006.01)

(56) References Cited

U.S. PATENT DOCUMENTS

| | | | | |
|---|---|---|---|---|
| 4,772,065 | A * | 9/1988 | Nakata | B60J 1/02 |
| | | | | 264/279 |
| 5,727,921 | A | 3/1998 | Brown | |
| 6,409,254 | B2 * | 6/2002 | Tiziano | B62D 23/00 |
| | | | | 296/190.03 |
| 6,990,759 | B2 * | 1/2006 | Evans | F16H 45/02 |
| | | | | 192/3.29 |
| 7,887,124 | B2 * | 2/2011 | Tsukamoto | B62D 33/0617 |
| | | | | 296/190.08 |
| 8,851,555 | B2 | 10/2014 | Gielda et al. | |
| 9,057,221 | B2 * | 6/2015 | Warr | E21B 7/02 |
| 9,193,395 | B2 * | 11/2015 | Kitashou | E02F 5/32 |
| 9,346,495 | B2 * | 5/2016 | Zurinski | E02F 9/163 |
| 2002/0121397 | A1 * | 9/2002 | Saarinen | B60N 2/39 |
| | | | | 180/89.12 |
| 2004/0217629 | A1 * | 11/2004 | Shioji | B60J 5/0487 |
| | | | | 296/190.11 |
| 2005/0280286 | A1 | 12/2005 | Kelley et al. | |
| 2010/0320022 | A1 | 12/2010 | Klas et al. | |
| 2012/0234617 | A1 * | 9/2012 | Suneya | B60K 35/00 |
| | | | | 180/78 |
| 2015/0165875 | A1 * | 6/2015 | Uchida | E02F 9/0808 |
| | | | | 62/239 |
| 2015/0298749 | A1 | 10/2015 | Zurinski et al. | |
| 2017/0129306 | A1 * | 5/2017 | Komatsu | B60H 1/00378 |
| 2018/0134115 | A1 * | 5/2018 | Shimada | B60H 1/32 |
| 2018/0194408 | A1 * | 7/2018 | Miyazaki | B62D 33/0617 |
| 2019/0345689 | A1 * | 11/2019 | Tatsuta | B62D 25/04 |
| 2020/0141168 | A1 * | 5/2020 | Lee | B60R 16/03 |
| 2020/0181966 | A1 * | 6/2020 | Kato | E02F 9/16 |

FOREIGN PATENT DOCUMENTS

| | | |
|---|---|---|
| JP | S63-76564 U | 5/1988 |
| JP | H02-123412 U | 10/1990 |
| JP | H03-005766 U | 1/1991 |
| JP | H06-185093 A | 7/1994 |
| JP | H07-10063 U | 2/1995 |
| JP | H08-1343 U | 9/1996 |
| JP | 2004-306793 A | 11/2004 |
| JP | 2008-49777 A | 3/2008 |
| JP | 2008-056139 A | 3/2008 |
| JP | 2013-209826 A | 10/2013 |
| KR | 10-2015-0093007 A | 8/2015 |

\* cited by examiner

CAB OF WORK VEHICLE, WORK VEHICLE, AND WHEEL LOADER

TECHNICAL FIELD

The present invention relates to a cab of a work vehicle, a work vehicle, and a wheel loader, and particularly to a cab of a work vehicle, and a work vehicle and a wheel loader including the cab.

BACKGROUND ART

Japanese Patent Laying-Open No. 2013-209826 (PTL 1) discloses an exemplary wheel loader including a cab. PTL 1 discloses the cab including therein an operator seat for an operator to take a seat.

CITATION LIST

Patent Literature

PTL 1: Japanese Patent Laying-Open No. 2013-209826

SUMMARY OF INVENTION

Technical Field

A wheel loader should include a hydraulic oil tank and an engine compartment in the rear of a cab.

Therefore, a space for attaching the cab to a vehicular body is restricted.

An object of the present disclosure is to provide a cab of a work vehicle capable of achieving good rear visual recognizability and an increased living space for an operator, a work vehicle, and a wheel loader.

Solution to Problem

A cab of a work vehicle in the present disclosure includes a pair of rear pillars, a pair of rear side face windows, and a rear face window. Each of the pair of rear side face windows extends rearward from each of the pair of rear pillars. The rear face window is connected to each of the pair of rear side face windows and located in the rear of the rear pillars. The rear face window is inclined such that an upper portion thereof is located more rearward than a lower portion thereof, and it is entirely made of glass from a first rear side face window representing one of the pair of rear side face windows to a second rear side face window representing the other of the pair of rear side face windows.

Advantageous Effects of Invention

According to the present disclosure, the rear face window is inclined such that the upper portion thereof is located more rearward than the lower portion thereof and it is entirely made of glass from the first rear side face window to the second rear side face window. Therefore, a wheel loader capable of achieving good rear visual recognizability and an increased living space for an operator can be realized.

DESCRIPTION OF EMBODIMENTS

An embodiment of the present disclosure will be described below with reference to the drawings.

Initially, a construction of a work vehicle in one embodiment of the present disclosure will be described with reference to FIG. 1. Though a wheel loader representing one example of a work vehicle to which the concept of the present disclosure can be applied will be described below, the work vehicle in the present disclosure is applicable also to a work vehicle including a cab, such as a hydraulic excavator and a crawler dozer, other than the wheel loader.

In the present example, positional relation of portions will be described with an operator who is seated at an operator seat 7 in a cab 10 being defined as the reference. A fore/aft direction refers to front and rear directions of the operator who is seated at operator seat 7. A lateral direction (a width direction) refers to left and right directions of the operator who is seated at operator seat 7. A vertical direction refers to upward and downward directions of the operator who is seated at operator seat 7.

A direction which the operator seated at operator seat 7 faces is the fore direction, and a direction opposite to the fore direction is the aft direction. The right side and the left side at the time when the operator seated at operator seat 7 faces the front is right and left directions, respectively. A foot side of the operator who is seated at operator seat 7 is defined as a lower side and a head side is defined as an upper side.

Figure 1:
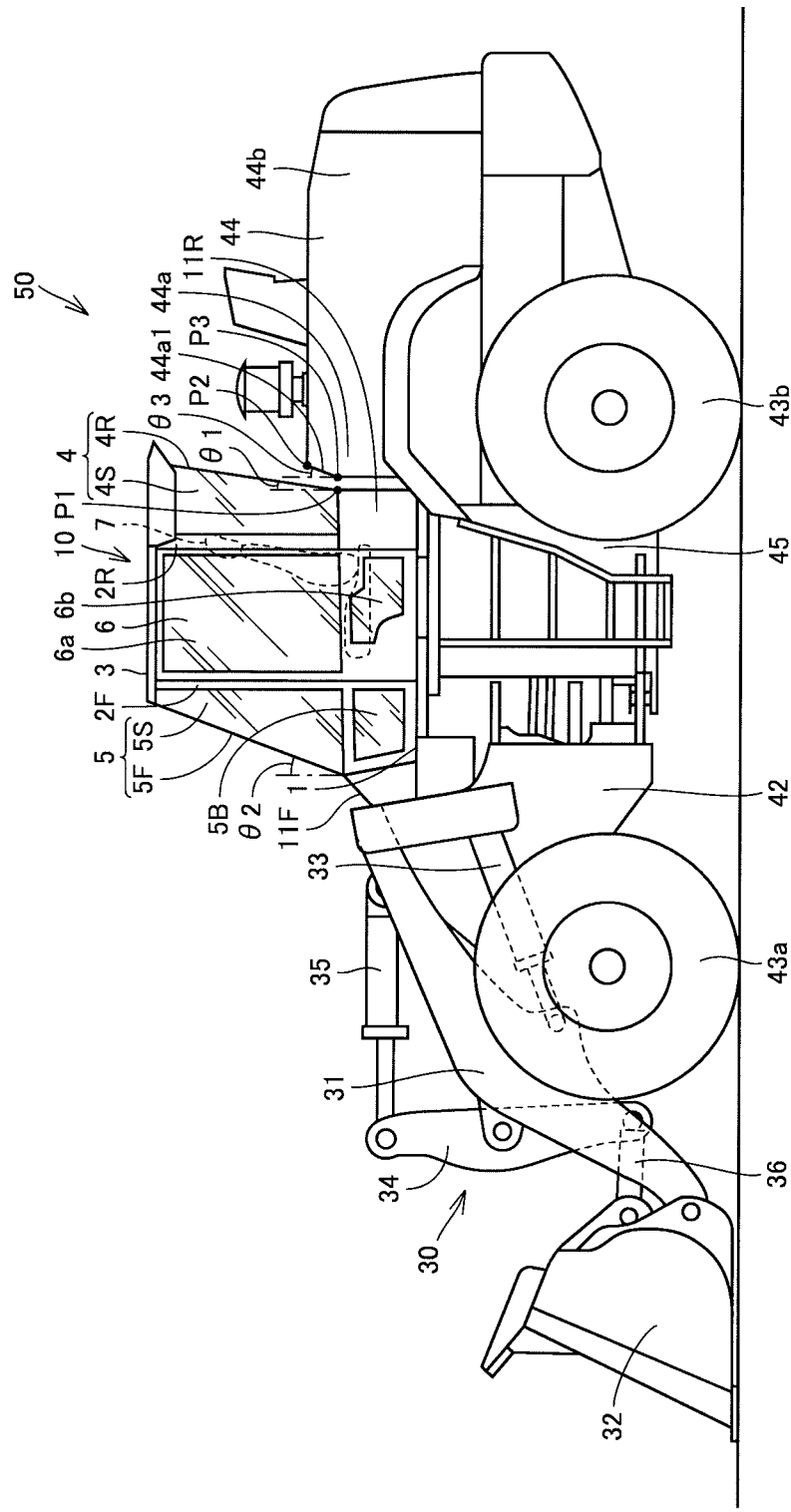
FIG. 1 is a schematic side view showing a construction of a wheel loader in one embodiment of the present disclosure.

FIG. 1 is a schematic side view showing a construction of a wheel loader in one embodiment. As shown in FIG. 1, a wheel loader 50 in the present embodiment mainly includes a front frame 42, a rear frame 45, a work implement 30, and cab 10. A front wheel 43a is attached to each of opposing side portions of front frame 42. A rear wheel 43b is attached to each of opposing side portions of rear frame 45.

Front frame 42 and rear frame 45 are attached to each other to freely laterally be actuated by means of a central pin (not shown). Front frame 42 and rear frame 45 implement a vehicular body frame of an articulated structure.

Specifically, front frame 42 and rear frame 45 are coupled to each other by a pair of left and right steering cylinders (not shown). As these left and right steering cylinders extend and contract, front frame 42 and rear frame 45 are laterally actuated and steered around the central pin.

Work implement 30 is attached in front of front frame 42. Work implement 30 includes a pair of booms 31, a bucket 32, a pair of boom cylinders 33, a bell clamp 34, a bucket cylinder 35, and a link 36.

Cab (operator's cab) 10 and a rear structure portion 44 are mounted on rear frame 45. Rear structure portion 44 is located in the rear of cab 10. Rear structure portion 44 includes a hydraulic oil tank 44a and an engine compartment 44b. Hydraulic oil tank 44a is arranged in front of engine compartment 44b. Front frame 42, rear frame 45, and rear structure portion 44 form a vehicular body of wheel loader 50.

Cab 10 is attached to the vehicular body. Cab 10 is arranged in front of hydraulic oil tank 44a in rear structure portion 44. Cab 10 defines a space for an operator to operate wheel loader 50 therein.

A construction of cab 10 will now be described with reference to FIGS. 2 to 6.

FIGS. 2, 3, 4, and 5 are a perspective view from above and behind, a perspective view from above and front, a rear view from behind, and a cutaway plan view from above, of the construction of the cab mounted on the wheel loader shown in FIG. 1, respectively. FIG. 6 is a schematic cross-sectional view along the line VI-VI in FIG. 4.

Figure 2:
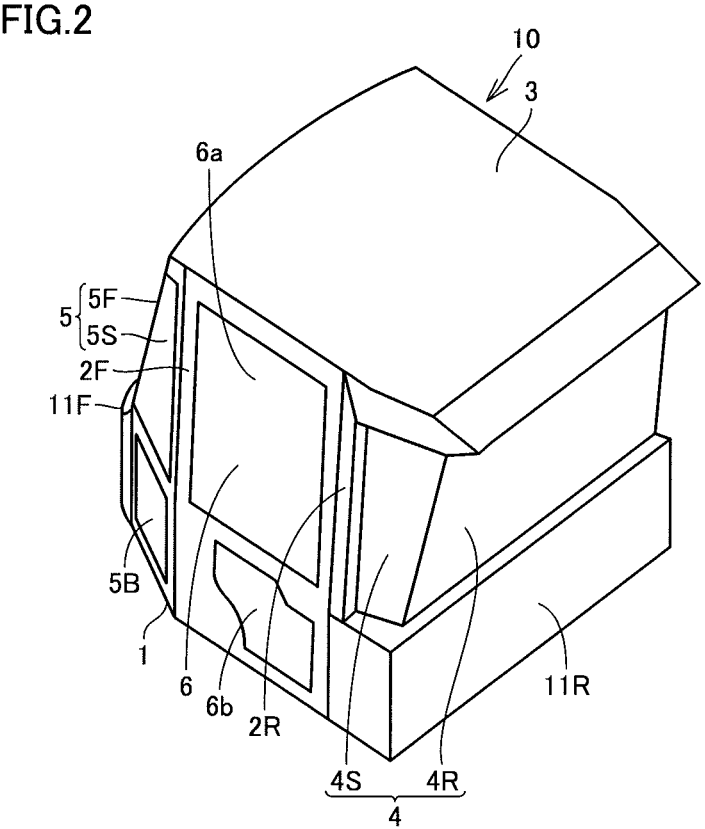
FIG. 2 is a perspective view of a construction of a cab mounted on the wheel loader shown in FIG. 1 when viewed from above and behind.
Figure 3:
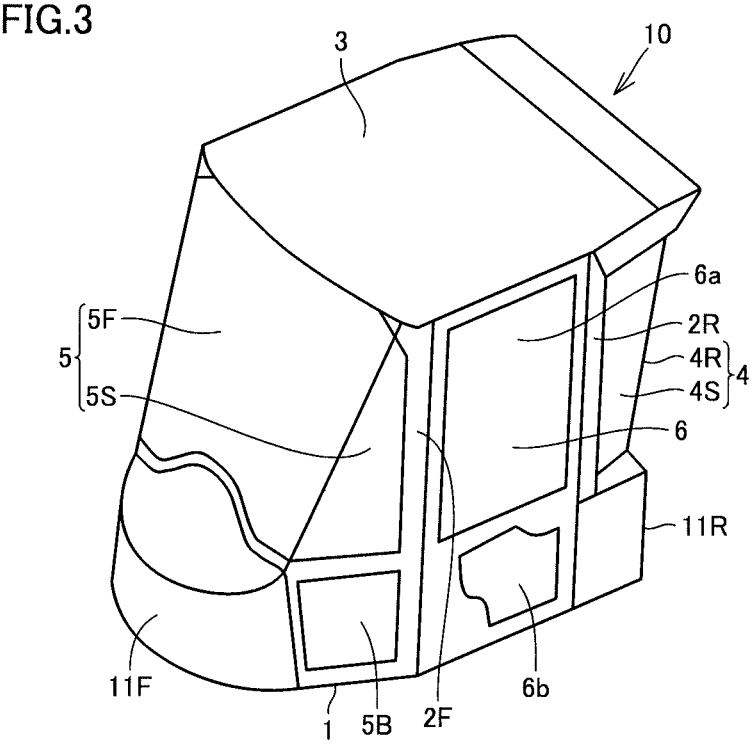
FIG. 3 is a perspective view of the construction of the cab mounted on the wheel loader shown in FIG. 1 when viewed from above and front.

As shown in FIGS. 2 and 3, cab 10 in the present embodiment mainly includes a floor panel 1, a plurality of pillars 2F and 2R, a roof portion 3, a rear window 4, a front window 5, a central sidewall 6, and exterior panels 11F and 11R.

The plurality of pillars 2F and 2R are attached to floor panel 1. Each of the plurality of pillars 2F and 2R extends upward from floor panel 1. Each of the plurality of pillars 2F and 2R is arranged such that its longitudinal direction vertically extends. The plurality of pillars 2F and 2R include a pair of foremost pillars 2F (front pillars) and a pair of rearmost pillars 2R (rear pillars).

The pair of foremost pillars 2F is located in front of the pair of rearmost pillars 2R. The pair of foremost pillars 2F is arranged at a lateral interval from each other. The pair of rearmost pillars 2R is arranged at a lateral interval from each other. Cab 10 includes only four pillars consisting of the pair of foremost pillars 2F and the pair of rearmost pillars 2R and includes no other pillars.

The pair of rearmost pillars 2R is located rearmost among the plurality of pillars 2F and 2R of cab 10 and cab 10 includes no other pillars in the rear of the pair of rearmost pillars 2R.

The pair of foremost pillars 2F is located foremost among the plurality of pillars 2F and 2R of cab 10 and cab 10 includes no other pillars in front of the pair of foremost pillars 2F. Cab 10 includes no other pillars between foremost pillar 2F and the rearmost pillar.

Roof portion 3 is arranged in an upper portion of cab 10 and supported by the plurality of pillars 2F and 2R with respect to floor panel 1. A beam member 14 (FIG. 6) is connected to each of an upper end portion of foremost pillar 2F and an upper end portion of rearmost pillar 2R.

Front window 5 is arranged in front of the pair of foremost pillars 2F. Front window 5 includes a front face window 5F and a pair of front side face windows 5S. Each of the pair of front side face windows 5S is arranged to extend forward from each of the pair of foremost pillars 2F. Front face window 5F is connected to each of the pair of front side face windows 5S. Front face window 5F is located in front of the pair of foremost pillars 2F.

Front face window 5F and front side face windows 5S are connected to each other, for example, by a sealing material. Each of front face window 5F and the pair of front side face windows 5S is made, for example, of glass. Front window 5 is thus made of glass on three sides consisting of front face window 5F and the pair of front side face windows 5S.

Exterior panel 11F is arranged below front face window 5F. A lower window 5B is arranged below front side face window 5S. An exterior panel instead of lower window 5B may be arranged below front side face window 5S.

Central sidewall 6 is arranged between foremost pillar 2F and rearmost pillar 2R. Central sidewall 6 includes a window 6a. Central sidewall 6 may include a lower window 6b below window 6a.

Central sidewall 6 may be provided as a door for boarding. When central sidewall 6 is provided as the door for boarding, door for boarding 6 is supported, for example, by rearmost pillar 2R for opening and closing. Door for boarding 6 serves as a port of entry and exit for an operator who operates wheel loader 50. Central sidewall 6 may be fixed (permanently set) as being fitted between foremost pillar 2F and rearmost pillar 2R.

Rear window 4 is arranged in the rear of the pair of rearmost pillars 2R. Rear window 4 includes a rear face window 4R and a pair of rear side face windows 4S. Each of the pair of rear side face windows 4S is arranged to extend rearward from each of the pair of rearmost pillars 2R. Rear face window 4R is connected to a rear end of each of the pair of rear side face windows 4S. Rear face window 4R is located in the rear of the pair of rearmost pillars 2R.

Rear face window 4R and rear side face windows 4S are connected to each other, for example, by a sealing material. Each of rear face window 4R and the pair of rear side face windows 4S is made, for example, of glass. Rear window 4 is thus made of glass on three sides consisting of rear face window 4R and the pair of rear side face windows 4S.

Figure 4:
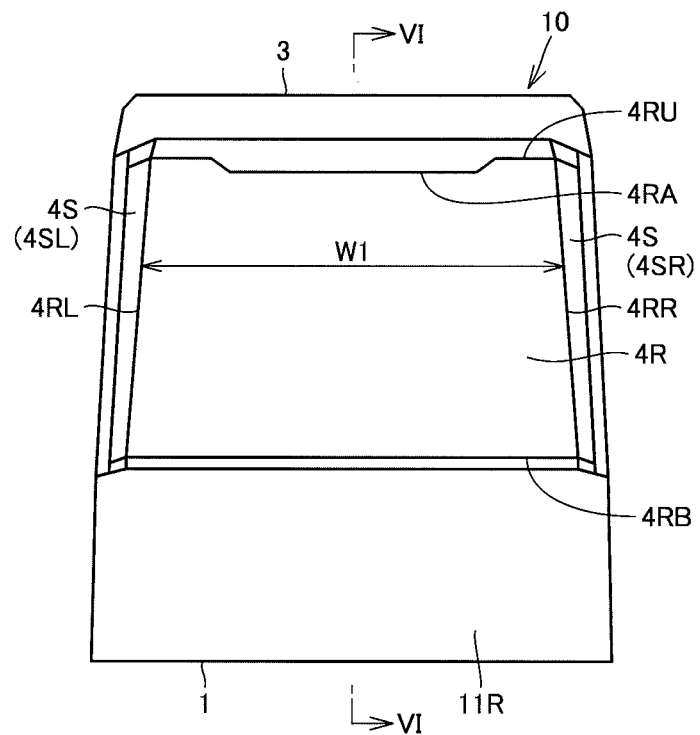
FIG. 4 is a rear view of the construction of the cab mounted on the wheel loader shown in FIG. 1 when viewed from behind.

Rear face window 4R is entirely made of glass from first rear side face window 4S (4SR: FIG. 4) representing one of the pair of rear side face windows 4S to second rear side face window 4S (4SL: FIG. 4) representing the other of the pair of rear side face windows 4S. No other pillar is arranged in a region between the pair of rear side face windows 4S and in the rear of the region.

No other pillar is arranged in a region in cab 10 lying between the pair of rear side face windows 4S and in front of rear face window 4R. No other pillar is arranged either outside cab 10 in the rear of rear face window 4R. No other pillar of cab 10 is arranged either outside cab 10 and lateral to the pair of rear side face windows 4S.

Exterior panel 11R is arranged below rear face window 4R and rear side face windows 4S.

As shown in FIG. 1, front face window 5F is inclined such that an upper portion thereof is located more rearward than a lower portion thereof. Front face window 5F as a whole from the lower end to the upper end thereof is inclined such that the upper portion thereof is located more rearward than the lower portion thereof. Front face window 5F may include a portion inclined such that an upper portion thereof is located more rearward than a lower portion thereof, within a range from the lower end to the upper end thereof.

Rear face window 4R is inclined such that an upper portion thereof is located more rearward than a lower portion thereof. Rear face window 4R as a whole from a lower end to an upper end thereof is inclined such that the upper portion thereof is located more rearward than the lower portion thereof. Rear face window 4R may include a portion inclined such that an upper portion thereof is located more rearward than a lower portion thereof, within a range from the lower end to the upper end thereof.

An angle of inclination θ1 of rear face window 4R in a side view shown in FIG. 1 is equal to an angle of inclination θ2 of front face window 5F or closer to a vertical direction than angle of inclination θ2. Specifically, while wheel loader 50 is set on the horizontal ground, angle of inclination θ1 of rear face window 4R with respect to the vertical line in the side view is equal to or smaller than angle of inclination θ2 of front face window 5F with respect to the vertical line.

While wheel loader 50 is set on the horizontal ground, angle of inclination θ1 of rear face window 4R with respect to the vertical line in the side view may be greater than angle of inclination θ2 of front face window 5F with respect to the vertical line.

A gap is provided between a front portion of rear structure portion 44 (a front part of a portion accommodating hydraulic oil tank 44a) and the rear end of cab 10. Specifically, a gap is provided between the front portion of rear structure portion 44 and rear face window 4R and between the front portion of rear structure portion 44 and exterior panel 11R.

While wheel loader 50 is set on the horizontal ground, a height position of an upper end P2 in the front portion of rear structure portion 44 is located above a height position of a lower end P1 of rear face window 4R. The front portion of rear structure portion 44 includes an inclined portion 44a1 which extends from a prescribed height position P3 (a lower position) to upper end P2. Inclined portion 44a1 is inclined upward and rearward from prescribed height position P3 toward upper end P2.

Inclined portion 44a1 is inclined at an angle of inclination θ3 with respect to the vertical line. Angle of inclination θ3 may be equal to or greater than angle of inclination θ1 of rear face window 4R. When a gap between the front portion of rear structure portion 44 and the rear end of cab 10 is relatively great, angle of inclination θ3 may be smaller than angle of inclination θ1 of rear face window 4R.

As shown in FIG. 4, at a point of view from behind cab 10, rear face window 4R is substantially trapezoidal. An upper side 4RU and a lower side 4RB of rear face window 4R are substantially parallel to each other. A recess 4RA recessed downward may be provided in a central portion of upper side 4RU of rear face window 4R. Rear face window 4R is constructed such that a right side 4RR and a left side 4RL are closer to each other in a direction upward from below. Specifically, at the point of view from behind cab 10, rear face window 4R has a width W decreasing in the direction upward from below.

Figure 5:
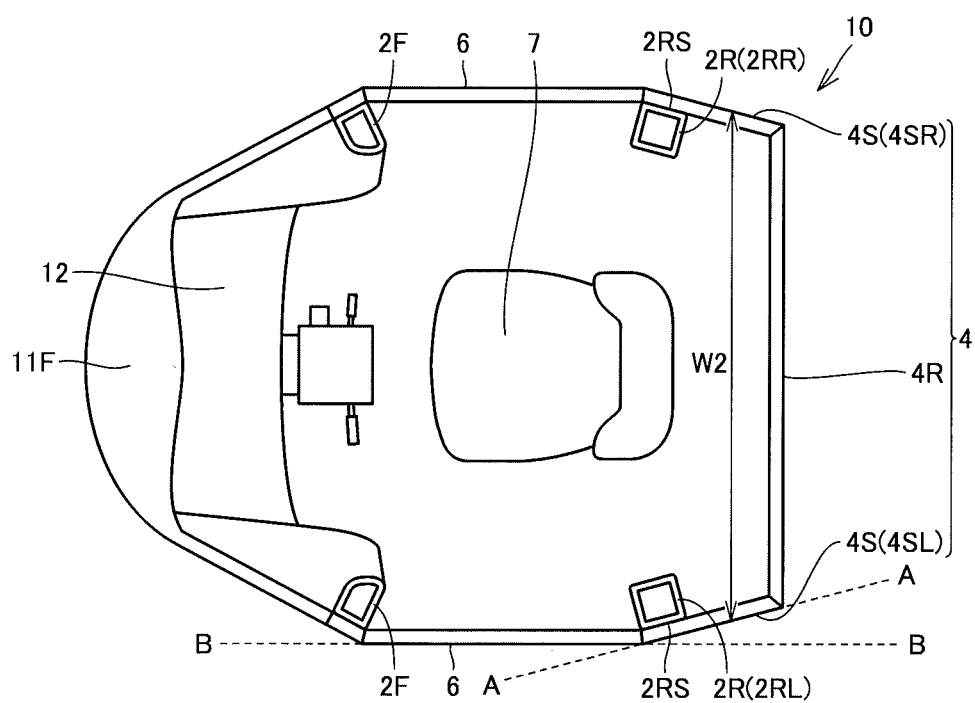
FIG. 5 is a cutaway plan view of the construction of the cab mounted on the wheel loader shown in FIG. 1 when viewed from above.
Figure 6:
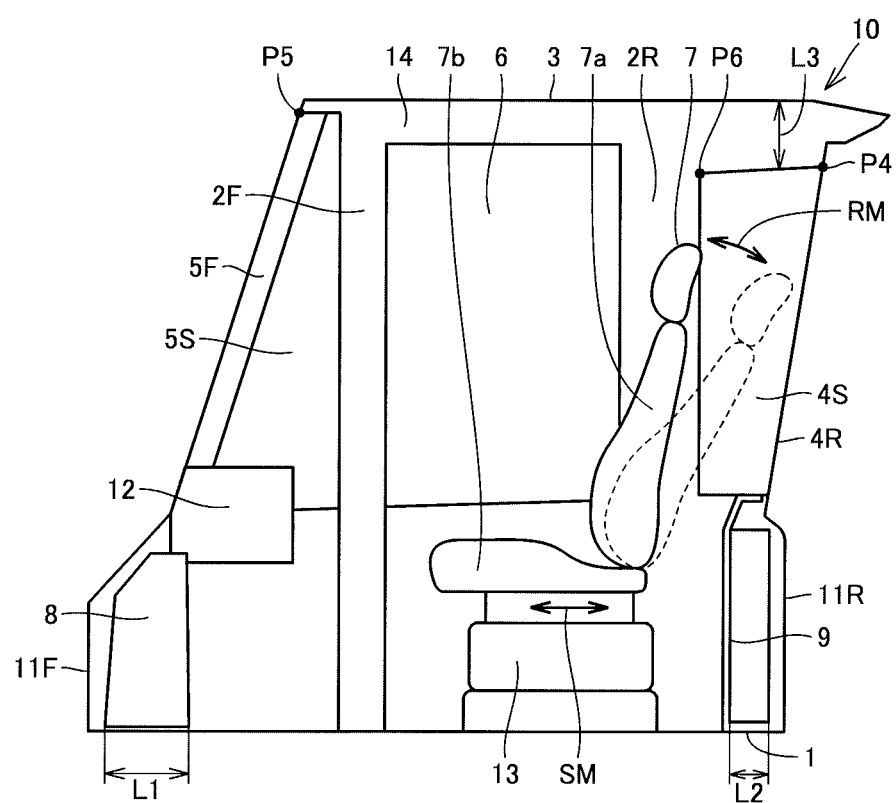
FIG. 6 is a schematic cross-sectional view along the line VI-VI in FIG. 4.

As shown in FIG. 5, in a plan view, first rear side face window 4S (4SR) and second rear side face window 4S (4SL) are arranged as being closer to each other in a direction rearward from front. Specifically, in the plan view, a distance W2 between first rear side face window 4S (4SR) and second rear side face window 4S (4SL) decreases in the direction rearward from front.

In the plan view, a surface of rear side face window 4S on an outer side of cab 10 (a surface along a virtual straight line A) is inclined with respect to a surface of central sidewall 6 on the outer side of cab 10 (a surface along a virtual straight line B) continuous to rear side face window 4S.

In the plan view, a side surface 2RS of each of the pair of rearmost pillars 2R which faces opposite to the internal space in cab 10 is located toward the internal space in cab 10 in the direction rearward from front. Specifically, side surface 2RS of first rearmost pillar 2R (2RR) representing one of the pair of rearmost pillars 2R is substantially in parallel to the surface of first rear side face window 4S (4SR) on the outer side of cab 10. Side surface 2RS of second rearmost pillar 2R (2RL) representing the other of the pair of rearmost pillars 2R is substantially in parallel to the surface of second rear side face window 4S (4SL) on the outer side of cab 10 (the surface along virtual straight line A).

Side surface 2RS of first rearmost pillar 2R (2RR) is a portion of bonding to first rear side face window 4S (4SR) and substantially in parallel to rear side face window 4S to be bonded to side surface 2RS. Side surface 2RS of second rearmost pillar 2R (2RL) is a portion of bonding to second rear side face window 4S (4SL) and substantially in parallel to rear side face window 4S to be bonded to side surface 2RS.

The plan view means a point of view in a direction orthogonal to an upper surface of floor panel 1.

As shown in FIG. 6, operator seat 7, an air-conditioning unit 8, and a front console 12 are arranged in the inside (internal space) of cab 10. Operator seat 7 is a portion where an operator who operates the wheel loader is seated. The inside or the internal space of cab 10 means a portion or a space surrounded by floor panel 1, the plurality of pillars 2F and 2R, roof portion 3, rear window 4, front window 5, central sidewall 6, and exterior panels 11F and 11R.

Operator seat 7 is constructed to be tilted along an arrow RM. Specifically, a backrest 7a of operator seat 7 can be inclined along arrow RM with respect to a seat portion 7b. Operator seat 7 is constructed to be slidable in the fore/aft direction along an arrow SM. Specifically, seat portion 7b of operator seat 7 can be slid in the fore/aft direction along arrow SM with respect to a support base 13 which supports seat portion 7b.

Front console 12 and air-conditioning unit 8 are arranged in front of operator seat 7. Front console 12 includes a front operation panel (front operation portion). The front operation panel includes, for example, a parking brake switch, an electronic controlled suspension system (ECSS) switch, a working light switch, and a wiper switch.

Air-conditioning unit 8 is arranged below front console 12. Air-conditioning unit 8 is arranged to project below front console 12 and forward from a front end of each of front console 12 and front face window 5F.

Air-conditioning unit 8 includes an indoor and outdoor air switch door, a fan, an evaporator, a heater core, and the like. The fan takes in indoor air and outdoor air into air-conditioning unit 8, sends air to the evaporator and the heater core, and thereafter sends air into the internal space in cab 10. Air in the internal space in cab 10 is thus conditioned.

A rear cover 9 is placed in a lower rear portion in the internal space in cab 10. Rear cover 9 functions also as a decorative panel. A space is provided between rear cover 9 and exterior panel 11R. Electrical components such as wires and the like are arranged in this space. A dimension L2 in the fore/aft direction of the space is smaller than a dimension L1 in the fore/aft direction of air-conditioning unit 8.

A height position of an uppermost end P5 of front face window 5F is higher than a height position of an uppermost end P4 of rear face window 4R. An operator who operates work implement 30 in cab 10 can thus visually recognize work implement 30 through front face window 5F up to a high position and reliability of works is improved.

Since the height position of uppermost end P4 of rear face window 4R is lower than the height position of uppermost end P5 of front face window 5F, a large dimension L3 of a gap between roof portion 3 and a ceiling portion above rear face window 4R can be secured. Therefore, electrical components such as wires can readily be arranged in this gap.

Cab 10 further includes beam member 14. Beam member 14 connects the upper end of foremost pillar 2F and the upper end of rearmost pillar 2R to each other. Beam member 14 may be as thick as or thicker than each of foremost pillar 2F and rearmost pillar 2R. Thus, a cab in conformity with the rollover protective structure (ROPS) or what is called a ROPS cab can be obtained even though the number of pillars of cab 10 is set to four.

A function and effect of the present embodiment will now be described.

As shown in FIG. 6, according to the present embodiment, rear face window 4R is inclined such that the upper portion thereof is located more rearward than the lower portion thereof. The internal space in cab 10 is thus made larger in an upper rear portion and a living space for an operator can be made larger without increasing a space for attaching cab 10 to the vehicular body.

Since the internal space in cab 10 is made larger in the upper rear portion, backrest 7a of operator seat 7 can greatly be inclined rearward along the direction of arrow RM with respect to seat portion 7b. Operator seat 7 can also greatly be slid rearward along the direction of arrow SM. A movable range of the operator seat where the seat can be tilted or slid can also be made larger.

Since the internal space in cab 10 is made larger rearward in the upper rear portion, an operator easily has a look at a portion behind and below cab 10 from within cab 10.

Rear face window 4R is entirely made of glass from first rear side face window 4S (4SR) representing one of the pair of rear side face windows 4S to second rear side face window 4S (4SL) representing the other of the pair of rear side face windows 4S. Therefore, an operator can visually recognize the rear through the entire rear face window 4R between the pair of rear side face windows 4S. Therefore, rear visual recognizability of the operator in cab 10 is good.

The entire rear face window 4R between the pair of rear side face windows 4S is made of glass and no other pillar is arranged in a region between the pair of rear side face windows 4S and in the rear of the region. Therefore, the living space in cab 10 is not narrowed by other pillars and a large living space can be secured. A field of view of an operator in cab 10 is not blocked by other pillars either and visibility is also good.

As set forth above, cab 10 in the present embodiment can have an increased living space for an operator without increasing a space for attaching cab 10 to the vehicular body. According to cab 10 in the present embodiment, a living space for an operator can be made larger as set forth above and rear visual recognizability is good. Thus, rear visual recognizability during V-shape loading representing works by a wheel loader is good.

In the V-shape loading, initially, excavation at a certain position is performed, and thereafter the boom is raised to lift such a load as soil in the bucket while the vehicle moves rearward at the same time. Thereafter, a direction of travel is switched from rearward travel to forward travel, and the boom is further raised while the vehicle moves forward at the same time to approach a dump truck. The load in the bucket is ejected into the dump truck by dumping the bucket.

The operator has to drive the vehicle rearward while the operator visually recognizes the rear of the vehicle in travel rearward after excavation in the V-shape loading. In addition, the operator has to drive the vehicle forward while the operator looks to front and front above of the vehicle when the vehicle approaches the dump truck and ejects the load into the dump truck by dumping the bucket in the V-shape loading. Therefore, improvement in rear visual recognizability and front visual recognizability of the operator in the V-shape loading is important in works by the wheel loader.

According to the present embodiment, as shown in FIG. 1, front face window 5F is inclined such that the upper portion thereof is located more rearward than the lower portion thereof. Thus, visibility of front above is good when the vehicle approaches the dump truck and ejects the load into the dump truck by dumping the bucket in the V-shape loading.

By inclining front face window 5F as above, the internal space in cab 10 is made larger in a lower front portion. Therefore, as shown in FIG. 6, while a large living space for an operator is secured, front console 12 and air-conditioning unit 8 are readily arranged in the lower front portion in the internal space in cab 10.

According to the present embodiment, as shown in FIG. 1, angle of inclination $\theta 1$ of rear face window 4R in the side view is equal to angle of inclination $\theta 2$ of front face window 5F or closer to a vertical direction than angle of inclination $\theta 2$ of front face window 5F. The internal space in cab 10 can thus be made larger while interference between rear face window 4R and the front portion of rear structure portion 44 is avoided.

According to the present embodiment, as shown in FIG. 4, at a point of view from behind cab 10, rear face window 4R decreases in width W in the direction upward from below. Thus, collision of an upper side portion of cab 10 with an obstacle during travel and works by wheel loader 50 can be suppressed.

According to the present embodiment, as shown in FIG. 1, the height position of upper end P2 in the front portion of rear structure portion 44 is located above the height position of lower end P1 of rear face window 4R. Since lower end P1 of rear face window 4R is thus located at a position lower than upper end P2 in the front portion of rear structure portion 44, the operator readily visually recognizes a portion lateral to rear structure portion 44 through rear face window 4R.

According to the present embodiment, as shown in FIG. 1, the front portion of rear structure portion 44 includes inclined portion 44a1 which extends from prescribed height position P3 (lower position) to upper end P2. Inclined portion 44a1 is inclined upward and rearward from prescribed height position P3 toward upper end P2. Interference of rear face window 4R with the front portion of rear structure portion 44 is thus suppressed.

In the sense of avoiding interference between rear face window 4R and the front portion of rear structure portion 44, angle of inclination $\theta 3$ of inclined portion 44a1 in the front portion of rear structure portion 44 is preferably not smaller than angle of inclination $\theta 1$ of rear face window 4R.

According to the present embodiment, as shown in FIG. 6, the height position of uppermost end P4 of rear face window 4R is higher than a height position of an upper end P6 at a front end of each of the pair of rear side face windows 4S. Large dimension L3 of the gap between roof portion 3 directly above upper end P6 and the ceiling portion can thus be secured and a height of rear face window 4R can be high. Therefore, arrangement of an electrical component in the gap is facilitated and rear visual recognizability is good.

According to the present embodiment, as shown in FIG. 5, in the plan view, distance W2 between first rear side face window 4S (4SR) and second rear side face window 4S (4SL) decreases in the direction rearward from front. Thus, an angle of joint between first rear side face window 4S (4SR) and rear face window 4R and an angle of joint between second rear side face window 4S (4SL) and rear face window 4R are greater than the right angle (90°). Therefore, first rear side face window 4S (4SR) and rear face window 4R can be joined to each other in a stable manner and second rear side face window 4S (4SL) and rear face window 4R can be joined to each other in a stable manner.

According to the present embodiment, as shown in FIG. 5, in the plan view, side surface 2RS of each of the pair of rearmost pillars 2R which faces opposite to the internal space in cab 10 is located toward the internal space in cab 10 in the direction rearward from front. Side surface 2RS of rearmost pillar 2R and the surface of rear side face window 4S can thus be substantially in parallel to each other. Therefore, a bonding surface between side surface 2RS of rearmost pillar 2R and the surface of rear side face window 4S can be secured.

According to the present embodiment, as shown in FIG. 6, air-conditioning unit 8 is arranged in front of operator seat 7. If air-conditioning unit 8 is arranged in the rear of operator seat 7, operator seat 7 is arranged on a front side in cab 10 as compared with a case of arrangement of air-conditioning unit 8 in front of operator seat 7. In this case, when a large operator sits on operator seat 7, a space around feet of the operator is narrow.

In contrast, when air-conditioning unit 8 is arranged in front of operator seat 7 as shown in FIG. 6, operator seat 7 can be arranged toward the rear in cab 10. Therefore, even when a large operator sits on operator seat 7, a large space around feet of the operator can be secured.

Air-conditioning unit 8 is arranged to project below front console 12 and forward from the front end of each of front console 12 and front face window 5F. Therefore, air-conditioning unit 8 is arranged substantially without interference with a most part of a region directly under front console 12. Therefore, even when a large operator sits on operator seat 7, air-conditioning unit 8 can be prevented from narrowing a space around feet of the operator.

Even when operator seat 7 is arranged toward the rear in cab 10, the internal space in cab 10 is made larger in the upper rear portion as a result of inclination of rear face window 4R as set forth above. Since a space around the back of the head of the operator is thus made larger, even a large operator can tilt operator seat 7 and can be prevented from taking a cramped posture when the operator performs operations for driving and working.

Since air-conditioning unit 8 is arranged in front of operator seat 7, dimension L2 in the fore/aft direction of the space between rear cover 9 and exterior panel 11R can be smaller than dimension L1 in the fore/aft direction of air-conditioning unit 8. Thus, operator seat 7 can be arranged on the rear side in cab 10 and backrest 7a of operator seat 7 can be inclined further rearward.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST

1 floor panel; 2F foremost pillar; 2R rearmost pillar; 2RS side surface; 3 roof portion; 4 rear window; 4R rear face window; 4RA recess; 4S rear side face window; 5 front window; 5F front face window; 5S front side face window; 5B lower window; 6 central sidewall (door for boarding); 6a window; 6b lower window; 7 operator seat; 7a backrest; 7b seat portion; 8 air-conditioning unit; 9 rear cover; 10 cab; 11F, 11R exterior panel; 12 front console; 13 support base; 14 beam member; 30 work implement; 31 boom; 32 bucket; 33 boom cylinder; 34 bell clamp; 35 bucket cylinder; 36 link; 42 front frame; 43a front wheel; 43b rear wheel; 44 rear structure portion; 44a1 inclined portion; 44a hydraulic oil tank; 44b engine compartment; 45 rear frame; and 50 wheel loader

The invention claimed is:

1. A cab of a work vehicle comprising:
   a pair of rear pillars;
   a pair of rear side face windows each extending rearward from each of the pair of rear pillars; and
   a rear face window connected to each of the pair of rear side face windows and located in rear of the rear pillars, the rear face window being inclined such that an upper portion of the rear face window is located more rearward than a lower portion of the rear face window, the rear face window being entirely made of glass from a first rear side face window representing one of the pair of rear side face windows to a second rear side face window representing the other of the pair of rear side face windows,
   wherein each of the pair of rear side face windows is made of glass and is connected to the rear face window by a sealing material,
   in a view from behind the cab, the first rear side face window is located to the right of the rear face window, and the second rear side face window is located to the left of the rear face window, and
   in a plan view, (i) a surface of the first rear side face window is inclined with respect to a surface of a first central sidewall continuous to the first rear side face window, (ii) a surface of the second rear side face window is inclined with respect to a surface of a second central sidewall continuous to the second rear side face window, and (iii) the surface of the first central sidewall is substantially parallel to the surface of the second central sidewall.

2. The cab of a work vehicle according to claim 1, wherein the rear face window decreases in width in a direction upward from below at a point of view from behind the cab.

3. The cab of a work vehicle according to claim 1, wherein in the plan view, a distance between the first rear side face window and the second rear side face window decreases in a direction rearward from front.

4. The cab of a work vehicle according to claim 1, the cab further comprising:
   a pair of front pillars located in front of the pair of rear pillars; and
   a front-side window located in front of the pair of front pillars, wherein
   the front-side window is inclined such that an upper portion of the front-side window is located more rearward than a lower portion of the front-side window.

5. The cab of a work vehicle according to claim 4, wherein an angle of inclination of the rear face window is equal to an angle of inclination of a front-side window or closer to a vertical direction than the angle of inclination of the front-side window.

6. The cab of a work vehicle according to claim 1, wherein a height position of an uppermost end of the rear face window is higher than a height position of an upper end at a front end of each of the pair of rear side face windows.

7. The cab of a work vehicle according to claim 6, wherein in the plan view, a side surface of each of the pair of rear pillars which faces opposite to an internal space in the cab is located interior to the respective rear side face window and is substantially parallel to the respective rear side face window.

8. The cab of a work vehicle according to claim 1, the cab further comprising:
   an operator seat; and
   an air-conditioning unit arranged in front of the operator seat.

9. A work vehicle comprising:
the cab according to claim 1; and
a vertically swingable work implement arranged in front of the cab.

10. The work vehicle according to claim 9, the work vehicle further comprising a rear structure portion located in rear of the cab, wherein
a height position of an upper end in a front portion of the rear structure portion is located above a height position of a lower end of the rear face window.

11. The work vehicle according to claim 10, wherein
the front portion of the rear structure portion includes an inclined portion inclined upward and rearward from a lower position toward the upper end.

12. A wheel loader comprising the work vehicle according to claim 9.

13. The cab of a work vehicle according to claim 1, wherein
in the plan view, a surface of the second rear side face window is inclined with respect to a surface of a second central sidewall continuous to the second rear side face window.

14. The cab of a work vehicle according to claim 1, wherein
in the plan view, the first rear side face window and the second rear side face window are symmetrical with each other.

* * * * *